Feb. 14, 1939. E. E. HEWITT 2,147,299
FLUID PRESSURE BRAKE
Filed Aug. 24, 1935 2 Sheets-Sheet 1

INVENTOR
ELLIS E. HEWITT,
BY *Wm. M. Cady*
ATTORNEY

Patented Feb. 14, 1939

2,147,299

UNITED STATES PATENT OFFICE 2,147,299

FLUID PRESSURE BRAKE

Ellis E. Hewitt, Edgewood, Pa., assignor to The Westinghouse Air Brake Company, Wilmerding, Pa., a corporation of Pennsylvania Application August 24, 1935, Serial No. 37,701

5 Claims. (Cl. 303—15)

This invention relates to electropneumatic brakes and more particularly to a braking system in which the brakes may be controlled both electrically and pneumatically.

Braking systems have heretofore been developed which employ a brake pipe to supply fluid under pressure to reservoirs from which fluid is supplied to the vehicle brake cylinders to effect an application of the brakes, and in these systems the supply of fluid under pressure to the brake cylinders from the reservoirs, and the release of fluid under pressure from the brake cylinders is controlled by means of relay valve devices carried on each of the cars of the train, and which are controlled by variations in the pressure of the fluid in a control pipe.

In these systems the pressure of the fluid in the control pipe may be controlled by means of an engineer's brake valve which controls the supply and release of fluid under pressure to and from the control pipe, either directly or through a relay valve, together with electrically operated means which controls the supply of fluid to the control pipe from reservoirs on the cars, and the release of fluid under pressure from the control pipe through magnet valves mounted on the cars.

There is a possibility that in the event of a disturbance of the wires leading to the magnet valves, that the windings of both the application and release magnet valves employed in these systems will be energized at the same time, which would result in the release of fluid from the control pipe, and the loss of fluid in the reservoirs from which fluid is supplied in effecting an application of the brakes, with the result that no fluid would be available to effect a brake application.

There is a possibility also that in the event of a rupture of the control pipe, such as might be caused by a break in two of the train, the electrically operated means for supplying fluid to the control pipe will continue to supply fluid to the control pipe from the supply reservoirs until the fluid in these reservoirs is exhausted.

It is the principal object of the present invention to provide a braking system of the type described and incorporating means responsive to the pressure of the fluid in the brake pipe and controlling the electrically operated means for supplying fluid to the control pipe so as to cut off the supply of fluid by this means from the supply reservoirs on a reduction in the pressure of the fluid in the brake pipe.

Other objects of the invention and features of novelty will be apparent from the following description taken in connection with the accompanying drawings, in which.

Figures 1, 2:
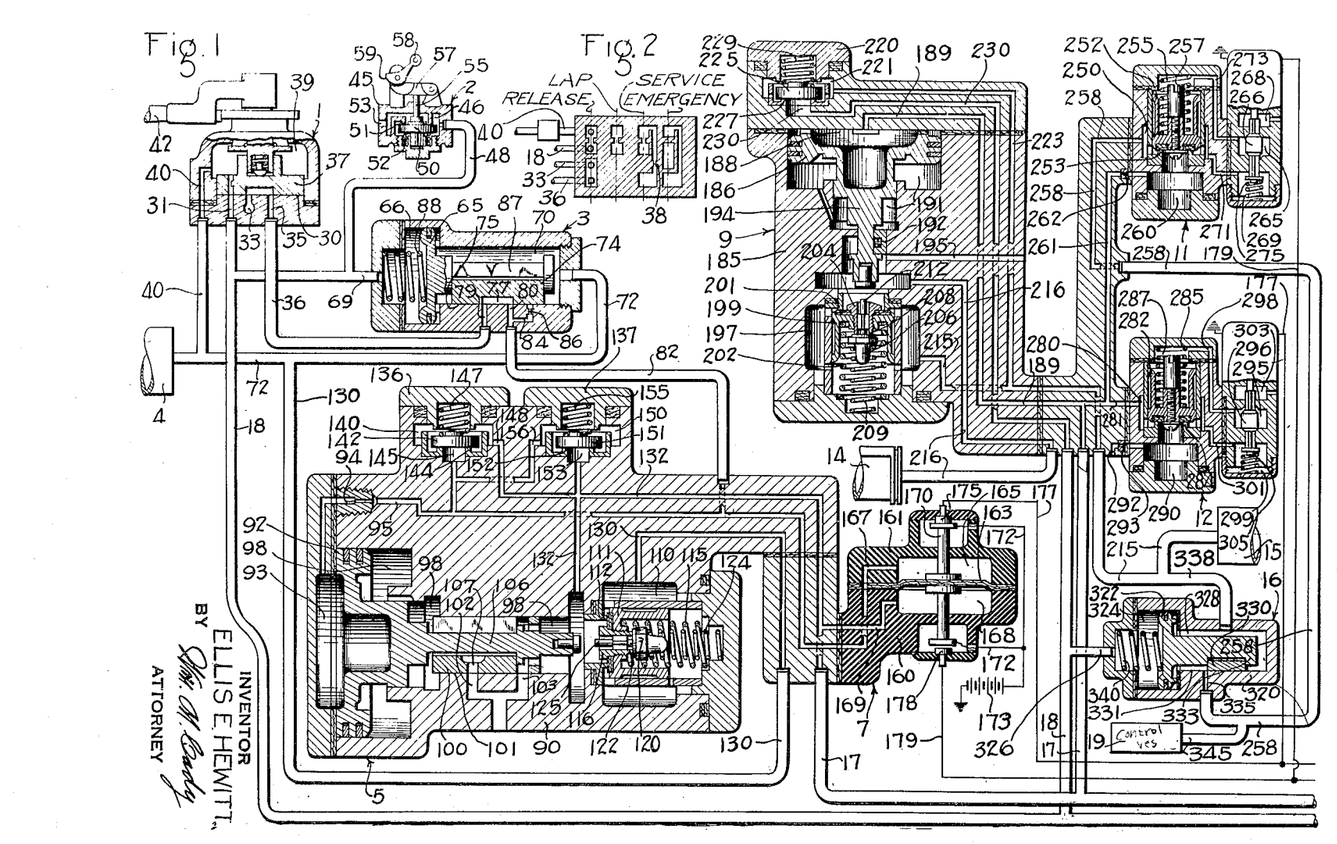
Fig. 1 is a diagrammatic view, largely in section, of one form of braking system embodying my invention.
Fig. 2 is a diagrammatic development of the manual control means employed in the system shown in Fig. 1.

Referring to Fig. 1 of the drawings, the system therein illustrated includes an engineer's brake valve 1, a conductor's brake valve 2, a fluid pressure operated valve device 3, a main reservoir 4, a relay valve 5, a fluid pressure operated switch device 7, a relay valve device 9, an application magnet valve device 11, a release magnet valve device 12, a brake cylinder 14, a supply reservoir 15, a fluid pressure operated valve device 16, a control pipe 17, a brake pipe 18, and a control reservoir 19.

The engineer's brake valve 1 comprises a body having a rotary valve seat 30 therein, the valve seat having a port 31 communicating with the brake pipe 18, an atmospheric exhaust port 33, and a port 35 which communicates with a pipe 36 which leads to the fluid pressure operated valve device 3.

The engineer's brake valve 1 has a rotary valve 37 mounted in a chamber therein, the rotary valve having ports formed therein adapted in different positions of the rotary valve, as will hereinafter more fully appear, to establish communication between the chamber 39 above the rotary valve, and which is constantly connected to the main reservoir 4 by way of a passage pipe 40, and the brake pipe 18, and the pipe 36, or between the pipe 36, or the brake pipe 18 and the atmospheric exhaust port 33. The rotary valve 37 is adapted to be operated between its different positions by means of the manual operating handle 42.

The conductor's brake valve 2 comprises a casing indicated generally by the reference numeral 45 and having a chamber 46 therein which is constantly connected to the brake pipe 18 by way of a pipe 48. The valve element 50 is mounted in the chamber 46, and is normally urged into engagement with a seat rib 51 by means of a spring 52 so as to cut off communication between the chamber 46 and the atmosphere by way of the passage 53. The valve 50 has a stem 55 which is adapted to be engaged by a lever 57 which is operated by means of a lever 58 having a cam surface 59 formed thereon and engageable with the lever 57.

When the lever 58 is rotated the cam surface 59 engages the lever 57 so as to move the lever 57 downwardly, and it presses on the stem 55 so as to move the valve 50 away from the seat 51, and thereby establish communication between the chamber 46 and the atmosphere by way of the passage 53.

The fluid pressure operated valve device 3 comprises a casing having a bore therein in which is mounted a piston 65 having a chamber 66 at one side thereof connected to the brake pipe 18 by way of a pipe 69.

The piston 65 has on the opposite side thereof a valve chamber 70 which is constantly connected to the main reservoir 4 by way of a pipe 72. A slide valve 74 is positioned in the valve chamber 70 and is slidable upon a seat 75, and has a cavity 77 formed therein which controls communication between a port 79 and the port 80 in the slide valve seat 75. The port 79 has connected thereto the pipe 36 leading from the engineer's brake valve 1, and the port 80 is connected by way of the pipe 82 with a passage in the relay valve device 5. The body of the fluid pressure operated valve device 3 also has a passage 84 formed therein which has a restricted portion 86 interposed therein. The passage 84 communicates with a port in the valve seat 75 and adapted to be uncovered by the end of the slide valve 74 in one position of the slide valve.

The slide valve 74 is operated by means of a stem 87 associated with the piston 65, while the piston 65 is normally urged to the right, as viewed in the drawings, by means of a spring 88.

The relay valve device 5 comprises a body indicated generally by the reference numeral 90, and having a bore therein in which is located the piston 92 having on one side thereof a chamber 93 which is connected through a restricted passage 94 with a passage 95 to which is connected the pipe 82.

The piston 92 has on the other side thereof a valve chamber 98, in which is mounted a slide valve 100, and which is slidable upon a seat 101 formed in the body 90, and this seat has a pair of ports 102 and 103 formed therein and communicating with the atmosphere. The slide valve 100 is adapted to be operated by a stem 106, which is formed integral with the piston 92, while the slide valve 100 has a port 107 extending therethrough and adapted in one position on the slide valve 100 to be substantially in alignment with the port 102 in the slide valve seat 101.

The body 90 in addition has a valve chamber 110 formed therein in which is mounted a valve 111, which is normally urged into engagement with a seat rib 112 by means of a spring 115. The valve 111 has associated therewith a member 116 which is adapted to be engaged by the end of the stem 106.

The valve 111 also has associated therewith a pilot valve device comprising a valve element 120 which is normally urged by means of a spring 124 into engagement with a seat rib 122 formed on the member 116. The valve element 120 has a stem 125 associated therewith and positioned in a bore in the member 116 and the stem 125 projects from the face of the member 116 so as to be engaged by the end of the stem 106 before the member 116 is engaged thereby.

The valve chamber 110 is constantly connected with the main reservoir 4 by way of a pipe and passage 130, while the valve chamber 98 is constantly connected with the control pipe 17 by way of a passage 132.

The relay valve device 5 has a pair of check valve devices associated therewith and indicated generally by the reference numerals 136 and 137. The check valve device 136 is adapted to permit flow from the passage 95 in the body 90 to the passage 132, and to prevent flow from passage 132 to the passage 95, while the check valve device 137 is adapted to permit flow from the passage 132 to the passage 95, and to prevent flow from the passage 95 to the passage 132.

The check valve device 136 comprises a chamber 140, in which is mounted a valve element 142, which is urged by a spring 147 into engagement with a seat rib 144 surrounding a passage 145 which communicates with the passage 95. On a predetermined increase in the pressure of the fluid in the passage 95 over that in the passage 132 the valve element 142 will be lifted off from the seat rib 144 by the pressure of the fluid in the passage 145 acting on the face of the valve 142 within the seat rib 144, and fluid will thereupon flow from the passage 95 to the chamber 140 and therefrom by way of the passage 148 to the passage 132.

The check valve device 137 is similar in construction to the check valve device 136, and comprises a chamber 150, in which is mounted a valve element 151, which is normally urged by a spring 155 into engagement with a seat rib 152 surrounding a passage 153 leading to the passage 132. The chamber 150 is connected to the passage 95 by way of a passage 156, and on an increase in the pressure of the fluid in the passage 132, the fluid in the passage 153 acting on the face of the valve 151 within the seat rib 152 will cause the valve element 151 to be moved away from the seat rib 152 so as to permit fluid to flow from the passage 132 to the chamber 150, and therefrom by way of the passage 156 to the passage 95.

The relay valve device 5 has associated therewith the fluid pressure operated switch device 7, which as shown, comprises a pair of housing sections 160 and 161 which have clamped therebetween the diaphragm 163, which has on one side thereof a chamber 165 which is constantly connected to the passage 95 by way of a passage 167, and which has on the other side thereof a chamber 168 which is constantly connected to the control pipe 17 by way of passage 169.

The diaphragm 163 has operatively connected thereto a stem 170, which is connected by means of wires 172 to one side of a source of current, such as the battery 173, the other side of which is connected to ground.

The housing section 161 of the fluid pressure operated switch device 7 has mounted thereon adjacent the end of the stem 170 a contact 175 which is connected by means of a wire 177 with the winding of the release magnet valve device 12.

The housing section 160 of the fluid pressure operated switch device 7 has mounted thereon a contact 178 which is connected by way of a wire 179 with the winding of the application magnet valve device 11.

The stem 170 is adapted in one position of the diaphragm 163 to engage the contact 175 to complete a circuit through said contact from the battery 173, and in another position of the diaphragm 163 to engage the contact 178 and establish a circuit through this contact from the battery 173.

The diaphragm 163 is constructed so as to normally maintain the stem 170 in engagement with the contact 175, and thus maintain a circuit through the winding of the release magnet valve device 12.

The relay valve device 9 comprises a body 185 having a bore therein in which is mounted a piston 186 having a chamber 188 on one side thereof which is constantly connected with the control pipe 17 by way of a passage 189.

The piston 186 has on the opposite side thereof a slide valve chamber 191, in which is mounted a slide valve 192, which is adapted to be operated by means of a stem 194 associated with the piston 186, and which controls communication between the slide valve chamber 191 and the atmosphere by way of a passage 195.

The body 185, in addition, has a valve chamber 197 formed therein in which is mounted a valve element 199, which is normally urged into engagement with a seat rib 201 by means of a spring 202 so as to cut off communication between the valve chamber 197 and the slide valve chamber 191. The valve element 199 has a member 204 associated therewith and adapted to be engaged by the end of the stem 194.

The valve 199, in addition, has associated therewith a pilot valve comprising a valve element 206, which is normally urged into engagement with a seat rib 208 on the member 204 by means of a spring 209, and which has associated therewith a stem 212 positioned in a bore extending through the member 204, the stem 212 projecting from the face of the member 204 so as to be engaged by the end of the piston stem 194 before the member 204 is engaged thereby.

The valve chamber 197 is constantly connected with the supply reservoir 15 by way of a passage and pipe 215, while the valve chamber 191 is constantly connected to the brake cylinder 14 by way of a passage and pipe 216.

The relay valve device 9 has associated therewith a check valve device indicated generally by the reference numeral 220 and comprising a chamber 221, which is constantly connected with the supply reservoir 15 by way of a passage 223 and the passage and pipe 215, and this chamber has positioned therein a valve element 225, which is normally urged into engagement with a seat rib 227 by means of a spring 229, while the area within the seat rib 227 is constantly connected to the brake pipe 17 by way of a passage 230.

The application magnet valve 11 comprises a casing having a chamber 250 therein, in which is mounted a valve element 252, which is normally urged into engagement with a seat rib 253 by means of a spring 255 and by the pressure of the fluid in a chamber 257 on the upper side of the valve element 252.

The valve element 252 is urged away from the seat rib 253 by the pressure of the fluid in the chamber 250 acting on the face of the valve element 252 outwardly of the seat rib 253. The valve element 252 controls communication between the chamber 250, which is connected to the reservoirs 15 and 19 by way of the passage and pipe 258, and a chamber 260, which is constantly connected to the control pipe 17 and the chamber 188 of the relay valve device 9 by way of the passage 261, which has interposed therein a restricted port 262.

The application magnet valve device 11 also includes a casing section having a chamber 265 formed therein in which is mounted a double beat valve element 266, which controls communication between the chamber 265, and a chamber 268, and a chamber 269. The chamber 268 is constantly connected to the atmosphere, while the chamber 269 is constantly connected to the chamber 250 by way of a passage 271. The chamber 265 is constantly connected to the chamber 257 on the upper side of the valve element 262 by means of a passage 273. The valve element 266 is normally held in engagement with its upper seat by means of a spring 275, so as to cut off communication between the chamber 265 and the chamber 268, and is urged downwardly against the spring to its lower seated position by the winding of the magnet valve device on energization thereof so as to cut off communication between the chamber 265 and the chamber 269, and permit communication between the chamber 265 and the chamber 268.

The release magnet valve device 12 comprises a casing having a chamber 280 therein which communicates by way of a passage 281 with the passage 261 which communicates with the control pipe 17 and with the chamber 188 in the relay valve device 9. The chamber 280 has mounted therein a valve element 282 which is normally held in engagement with a seat rib 284 by means of a spring 285, and by the pressure of the fluid in a chamber 287 on the upper side of the valve element 282.

The valve element 282 controls communication between the chamber 280 and thereby the control pipe 17, and a chamber 290 which is constantly connected to the atmosphere by way of a passage 292 having a restricted portion or choke 293 interposed therein.

The release magnet valve device 12 also includes a casing section having a chamber 295 formed therein in which is mounted a double beat valve element 296. The chamber 295 is in constant communication with the chamber 287 on the upper side of the valve element 282 by means of a passage 298, while the valve 296 is adapted to control communication between the chamber 295 and a chamber 299, which is constantly connected with the chamber 280 by way of a passage 301, and a chamber 303 which is constantly connected to the atmosphere.

The double beat valve element 296 is urged to its upper seated position by means of a spring 305 so as to cut off communication between the chamber 295 and the chamber 303, and is moved to its lower seated position, as shown in the drawings, on energization of the winding of the magnet valve device so as to cut off communication between the chamber 295 and the chamber 299, and to permit communication between the chamber 295 and the chamber 303.

The fluid pressure operated valve device 10 comprises a casing 320 having a bore therein in which is mounted a piston 322, having on one side thereof a chamber 324 which is constantly connected to the brake pipe 18 by way of a pipe 326.

The piston 322 has on the other side thereof a valve chamber 328, in which is mounted a slide valve 330, which is slidable upon a seat 331 formed on the casing 320 and which is adapted to be operated by means of a stem 333 associated with the piston 322.

The slide valve seat 331 has a port 335 formed therein and adapted to be uncovered by the slide valve 330 in one position thereof. The port 335 has the pipe 258 leading to the application magnet valve device 7 connected thereto. The valve chamber 328 is constantly connected to the supply reservoir 15 by way of a pipe 338, while the piston 322 is normally held by means of a spring 340 in the position in which it is shown in the drawings, in which position the port 335 is uncovered by the slide valve 330.

The control reservoir 19 is connected by means of a pipe 345 to the pipe 258 at a point intermediate the fluid pressure operated valve device 16 and the application magnet valve device 11.

In the installation of a system of this type on a train the engineer's brake valve 1, the conductor's brake valve 2, the fluid pressure operated valve device 3, the main reservoir 4, the relay valve device 5, and the fluid pressure operated switch device 7 are mounted on the engine, while each of the cars of the train is provided with a relay valve device 9, an application magnet valve device 11, a release magnet valve device 12, a brake cylinder 14, a supply reservoir 15, a fluid pressure operated valve device 16, and a control reservoir 19. The control pipe 17 and the brake pipe 18 are extended throughout the entire length of the train, the connections between the cars being made by means of flexible couplings. A conductor's brake valve 2 may also be installed on each of the cars in the train. In addition the wires 177 and 179 are carried throughout the length of the train.

In the operation of the system, assuming that the main reservoir 4 charged with fluid under pressure, and that the operating handle 42 of the engineer's brake valve 1 is turned to the release position, fluid will flow from the main reservoir by way of the pipe and passage 40 to the chamber 39 in the engineer's brake valve, and therefrom by way of a passage in the rotary valve 37 to the port 31 and the brake pipe 18. If desired the pressure of the fluid supplied from the main reservoir may be reduced by means of a feed valve not shown. The fluid which flows to the brake pipe 18 flows therethrough to the relay valve device 9, and the fluid which is supplied to the passage 230 in the relay valve device 9 unseats the check valve element 225 so that fluid flows to the chamber 221 in the check valve 220, and therefrom by way of the passage 223 to the supply reservoir 15 charging this reservoir with fluid under pressure.

Fluid which is supplied to the brake pipe 18 also flows therefrom by way of the pipe 326 to the chamber 324 in the fluid pressure operated valve device 16 and forces the piston 322 to the right as viewed in Fig. 1 of the drawings, if it is not already in this position. This causes the slide valve 330 to uncover the port 335 in the valve seat 331 to permit fluid to flow from the pipe 215 by way of the pipe 338 to the valve chamber 328, and therefrom by way of the port 335 and the pipe 345 to the control reservoir 19 charging this reservoir with fluid under pressure.

Fluid which is supplied from the valve device 16 to the pipe 258 also flows to the chamber 250 in the application magnet valve device 11, and from this chamber fluid flows by way of passage 271 to the chamber 265, and therefrom past the double beat valve 266 to the chamber 269 from which the fluid flows by way of the passage 273 to the chamber 257 on the spring side of the valve 252.

The fluid which is supplied to the brake pipe 18 also flows by way of the pipe 69 to the chamber 66 in the fluid pressure operated valve device 3, while fluid under pressure from the main reservoir 4 flows by way of the pipe 72 to the valve chamber 70 on the opposite side of the piston 65 of the valve device 3, and, as the pressures on opposite sides of the piston 65 are substantially equal, the piston 65 will be moved to the position in which it is shown in the drawings by means of the spring 88, in which position the slide valve 74 cuts off communication through the port 84 and establishes communication between the ports 79 and 80. Fluid also flows from the main reservoir 4 by way of the pipe 130 to the chamber 110 in the relay valve device 5.

Fluid supplied to the brake pipe 18 also flows by way of the pipe 48 to the chamber 46 in the conductor's brake valve 2.

When it is desired to effect an application of the brakes the operating handle 42 of the engineer's brake valve 1 is turned to the service position, in which position communication is maintained between the chamber 39, which is connected to the main reservoir, and the brake pipe 18, as is clearly shown in Fig. 2 of the drawings, which is a diagrammatic view of the ports in the engineer's brake valve.

When the operating handle 42 is turned to the service position a communication is established between the chamber 39 and the port 35, which has the pipe 36 connected thereto, the communication being by way of a choke or restricted portion 38 to limit the rate of flow of fluid from the main reservoir to the pipe 36.

Fluid which is supplied to the pipe 36 flows therethrough to the port 79 in the fluid pressure operated valve device 3 and therefrom by way of the cavity 77 in the slide valve 74 to the port 80, and thence by way of the pipe 82 to the passage 95 in the relay valve device 5.

Fluid which is supplied to the passage 95 flows therefrom to the passage 167 in the fluid pressure operated switch device 7, and thence to the chamber 165 where it forces the diaphragm 163 downwardly and thus moves the stem 170 out of engagement with the contact 175, thereby interrupting the circuit to the winding of the release magnet valve 12, and into engagement with the contact 176.

When the winding of the release magnet valve is deenergized, the valve 296 is moved to the upper seated position by the spring 305, so as to cut off communication between the chamber 295 and the atmosphere, and to establish communication between the chamber 299 and the chamber 295.

When the stem 170 engages the contact 176 a circuit is established through the winding of the application magnet valve device 11 and on energization of this winding the double beat valve element 266 is forced downwardly against the spring 275 so as to cut off communication between the chamber 269 and the chamber 265, and to establish communication between the chamber 265 and the atmosphere by way of the chamber 268. This permits fluid to escape from the chamber 257 on the upper side of the valve element 252 to the atmosphere, and on the release of fluid from the chamber 257, the fluid in the chamber 250 acting on the portion of the valve element 252 outwardly of the seat rib 253 forces this valve element upwardly so as to permit fluid to flow from the chamber 259 to the chamber 260, and therefrom through the restricted passage 262 and the passage 261 to the control pipe 17, and to the passage 189 in the relay valve device 9 which leads to the chamber 188.

Fluid supplied to the control pipe 17 by the application magnet valve device 11, or by any other source, flows by way of the passage 281 to the chamber 280 in the release magnet valve device 12 and from this chamber fluid flows by way of the passage 301 to the chamber 299 from which fluid may flow past the double beat valve 303 to the chamber 295, and therefrom by way of the passage 298 to the chamber 287 on the spring side of the valve 282, where it acts upon the valve 282 to maintain it in engagement with the seat rib 284.

The application magnet valve device 11 supplies fluid from the control reservoir 19, which will be recharged from the supply reservoir 15 which is maintained charged with fluid under pressure by flow from the brake pipe past the check valve 225, while the control reservoir is also charged from the brake pipe 18, assuming that the pressure of the fluid in the brake pipe has been maintained so that the slide valve 330 of the fluid pressure operated valve device 16 is maintained in a position to permit communication through the port 335 therein.

The fluid which is supplied to the passage 95 in the relay valve device 5 also flows by way of this passage and the restricted portion 94 to the chamber 93 on the left hand side of the piston 92, and forces this piston to the right as viewed in Fig. 1 of the drawings and after a certain amount of movement of the piston 92 the stem 106 engages the end of the slide valve 100, and moves it to the right so as to cut off communication through the ports 102 and 103 in the slide valve seat 101.

On further movement of the piston 92 the end of the stem 106 engages the end of the stem 125 of the pilot valve element 120 so as to move this valve element away from the seat rib 122 against the spring 124. This permits fluid to flow from the chamber 110 to the valve chamber 93 at a slow rate so as to permit the pressures in these chambers to approach equalization and thus reduce the force exerted by the fluid in the chamber 110 acting on the valve element 111, and tending to hold the valve element against the seat rib 112.

On further movement of the piston 92 the stem 106 will engage the member 116 and the valve 111 will be forced away from the seat 112 against the spring 115, and fluid will thereupon flow at a more rapid rate from the chamber 110, which is connected to the main reservoir 4, to the valve chamber 98, which is connected by way of the passage 132 to the control pipe 17.

The fluid which is supplied to the passage 95 also flows by way of the passage 145 to the chamber on the lower side of the valve element 142 of the check valve device 136, and, on a predetermined increase in the pressure of the fluid in the passage 95, the valve element 142 will be moved away from the seat rib 144 against the spring 147, and fluid will thereupon flow from the passage 95 to the chamber 149, which is connected by way of the passage 148 to the passage 132 which leads to the control pipe 17.

It will be seen, therefore, that on movement of the handle 42 of the engineer's brake valve 1 to the service position fluid may be supplied to the control pipe from a plurality of sources, one of these being by way of the application magnet valve device 11, another being by operation of the relay valve device 5, and another being by the supply of fluid to the passage 132 directly from the engineer's brake valve by way of the pipe 32 and the passage 95.

On an increase in the pressure of the fluid in the control pipe 17 the pressure of the fluid in the chamber 188 in the relay valve device 9 will be increased, and the piston 186 will be forced downwardly so that the end of the stem 194 engages the stem 212 of the pilot valve 206, causing the pilot valve 206 to be forced away from the seat rib 208 against the spring 209, while the slide valve 192 will be moved to a position to cut off communication to the passage 195.

Thereupon fluid will flow at a slow rate from the valve chamber 197, which is constantly connected to the supply reservoir 15 by way of the passage and pipe 215, to the slide valve chamber 191, which is connected to the brake cylinder 14 by way of the pipe and passage 216.

When the pilot valve 206 is unseated the pressures in the valve chamber 197 and the slide valve chamber 191 will tend to equalize, thus reducing the force exerted by the fluid under pressure in the chamber 197 and tending to hold the valve 199 against the seat rib 201. Thereafter on further movement of the piston 186 downwardly the valve 199 will be moved away from the seat rib 201 against the spring 202, and fluid will flow from the valve chamber 197 to the slide valve chamber 191, and therefrom to the brake cylinder at a more rapid rate.

On an increase in the pressure of the fluid in the control pipe 17 there will be a similar increase in the pressure of the fluid in the chamber 168 of the fluid pressure operated switch device 7, which is connected to the control pipe 17 by way of the passage 169, and when this pressure increases to a value substantially equal to that in the chamber 165 the diaphragm 163 will be moved upwardly so as to move the stem 170 to the lap position, in which position the stem is out of engagement with the contact 178 and the contact 175, so that the circuits to the windings of both the application magnet valve device 11 and the release magnet valve device 12 are interrupted. This cuts off the further supply of fluid to the control pipe 17 by the application magnet valve device 11.

Similarly, assuming that the handle 42 of the engineer's brake valve has been moved from the service position to the lap position, which results in the cutting off of the flow of fluid from the main reservoir to the pipe 36 and therefrom to the passage 95, the supply of fluid to the chamber 93 will be cut off, and, as soon as the pressure in the valve chamber 98 increases to a value substantially equal to that in the chamber 93, the piston 92 will be moved to the left and the stem 106 will move the slide valve 100 to the lap position, while the stem 106 will be moved out of engagement with the member 116 and the stem 125 of the pilot valve 120 so as to permit the valve 111 and the pilot valve 120 to seat and cut off the supply of fluid to the valve chamber 98 and thereby to the passage 132 from the main reservoir.

Likewise, when the supply of fluid under pressure to the pipe 36 is cut off the supply of fluid to the passage 95 will be cut off and the fluid can no longer flow from the passage 95 past the check valve 142 to the passage 132.

It will be seen, therefore, that when the handle 42 of the engineer's brake valve 1 is turned to the lap position after having been moved to the service position, the relay valve device 5 will operate to cut off the supply of fluid under pressure to the control pipe by way of the relay valve device as soon as the pressure in the control pipe 17 increases to a value substantially equal to that established by operation of the engineer's brake valve 1 in the pipe 82 leading to the relay valve device. Likewise the fluid pressure operated switch device 7 will operate to cut off the supply of fluid to the control pipe 17 by operation of the application magnet valve device 11 as soon as the pressure of the fluid in the control pipe 17 increases to a value substantially equal to that supplied to the fluid pressure operated switch device by operation of the engineer's brake valve 1.

The relay valve device 9 will operate to supply fluid under pressure to the brake cylinder 14 until the pressure of the fluid established in the brake cylinder and in the valve chamber 191 is substantially equal to that in the chamber 188 on the opposite side of the relay valve device piston 186, whereupon the piston 186 will be moved upwardly to the lap position, in which position the stem 194 is moved out of engagement with the member 204 and the stem 212 associated with the pilot valve 206, while the slide valve 192 laps the exhaust port 195.

This cuts off the further supply of fluid under pressure to the brake cylinder 14 and maintains the pressure of the fluid previously supplied to the brake cylinders.

If it is desired to increase the degree of application of the brakes the handle 42 of the engineer's brake valve 1 is again turned to the service position so as to again supply fluid under pressure to the pipe 36 and therefrom to the pipe 82 which leads to the passage 95 in the relay valve device 5, thereby increasing the pressure of the fluid in the chamber 165 of the fluid pressure operated switch device 7, thus causing the diaphragm 163 to move downwardly so as to move the stem 170 into engagement with the contact 178 and establish a circuit through the winding of the application valve device 11 so as to cause this magnet valve device to again supply fluid from the reservoir 19 to the control pipe 17.

In addition the pressure of the fluid in the chamber 93 of the relay valve device 5 will be increased, and this valve will be caused to operate to supply fluid to the control pipe 17.

The increase in the pressure of the fluid in the control pipe 17 results in an increase in the pressure of the fluid in the chamber 188 of the relay valve device 9, and causes this valve device to again operate to supply fluid under pressure to the brake cylinder 14.

When the desired degree of brake application has been secured the operating handle 42 of the engineer's brake valve is returned to the lap position so as to cut off the supply of fluid under pressure to the chamber 93 of the relay valve device 5, and to the chamber 165 of the fluid pressure operated switch device 7, and when the pressure of the fluid in the control pipe 17 increases to a sufficient value the relay valve device 5 and the fluid pressure operated switch device 7 will again move to their lap positions.

If it is desired to effect an emergency application of the brakes the handle 42 of the engineer's brake valve is turned to the emergency position, in which position the ports in the rotary valve 37 establish communication between the chamber 39 and the port 35, which has the passage and pipe 36 connected thereto, this communication not having a choke therein as does the port through which communication between these points is established in the service position of the engineer's brake valve.

In addition, when the handle 42 is turned to the emergency position, the rotary valve 37 cuts off communication between the chamber 39 and the port 31 leading to the brake pipe, and the ports in the rotary valve 37 establish communication between the port 31 and the atmospheric exhaust port 33 so as to release fluid from the brake pipe 18.

Upon a reduction in the pressure of the fluid in the brake pipe 18 there will be a similar reduction in the pressure of the fluid in the chamber 66 of the fluid pressure operated valve device 3, and the piston 65, being subject on the opposite side to main reservoir pressure in the valve chamber 70, will be moved to the left, as viewed in Fig. 1 of the drawings, against the spring 88, and the stem 87 will move the slide valve 74 on the valve seat 75 so that the cavity 77 in the slide valve no longer establishes communication between the ports 79 and 80, and so that the end of the slide valve 74 uncovers the port 84, with the result that fluid under pressure will flow from the main reservoir by way of the pipe 72 to the valve chamber 70, and therefrom through the restricted passage 86 and the port 84 to the pipe 82 leading to the relay valve device 5.

During the time interval after the handle 42 of the engineer's brake valve has been moved to the emergency position, and before the piston 65 is moved to the left as viewed in Fig. 1 of the drawings, fluid under pressure will flow through the engineer's brake valve 1 to the pipe 36 and therefrom to the port 79 and the cavity 77 to the passage 80 and therethrough to the pipe 82, but on movement of the piston 65 as the result of the reduction in the pressure of the fluid in the brake pipe, the supply of fluid to the pipe 82 from the pipe 36 will be cut off and fluid will thereafter be supplied to the pipe 82 from the valve chamber 70.

The rate of flow of fluid to the pipe 82 and therefrom to the chamber 93 in the relay valve device 5 and the chamber 165 in the fluid pressure operated switch device 7 is somewhat more rapid through the choke 86 than through the port in the rotary valve 37 through which fluid is supplied to the pipe 82 when the engineer's brake valve 1 is in the service position. This results in a more rapid increase in the pressure of the fluid in the relay valve device 5, and in the fluid pressure operated switch device 7, than occurs during a service application of the brakes, so that these devices are very quickly conditioned to increase the pressure of the fluid in the control pipe 17 and thus effect an application of the brakes.

An emergency application of the brakes may also be effected by means of the conductor's brake valve 2 by turning the lever 58 which causes the cam surface 59 to press upon the end of the lever 57, thereby forcing the stem 55 downwardly and moving the valve 50 away from the seat rib 51, thus permitting fluid to escape from the brake pipe 18 by way of the pipe 48.

The consequent reduction in the pressure of the fluid in the brake pipe 18, which will take place even though the engineer's brake valve 1 is in the release or lap position, in which position fluid is supplied to brake pipe at a rate less rapid than the rate at which fluid is vented from the brake pipe 18 by means of the conductor's brake valve, causes the piston 65 of the fluid pressure operated valve device 3 to be moved to the emergency position and conditions the valve device 3 to supply under pressure to the pipe 82 to effect an application of the brakes.

In order to effect a release of the brakes after an application the handle 42 of the engineer's brake valve 1 is turned to the release position, in which position a port in the rotary valve 37 establishes a communication between the chamber 39 and the brake pipe 18 so as to re-establish the pressure of the fluid in the brake pipe if there has been a reduction in the pressure in the brake pipe, and at the same time the ports in the rotary valve 37 establish communication between the port 35, leading from the pipe 36, and the atmospheric exhaust port 33.

When the port 35 is connected to the atmospheric exhaust port 33 fluid under pressure is permitted to flow from the pipe 36 to the atmosphere, and as the pipe 36 is in communication with the pipe 82 and the passage 95 of the relay valve device 5 by way of the cavity 77 in the slide valve 74 of the fluid pressure operated valve device 3, fluid will flow from the passage 95 to the atmosphere.

If at the time the engineer's brake valve 1 is turned to the release position the slide valve 74 is not in the position in which the cavity 77 establishes communication between the ports 79 and 80, it will be moved to this position as soon as the pressure of the fluid in the brake pipe 18 is re-established.

Upon the release of fluid under pressure from the passage 95 fluid will be released from the chamber 165 in the fluid pressure operated switch device 7, and, on a reduction in the pressure of the fluid in the chamber 165, the diaphragm 163 will be moved upwardly by the pressure of the fluid in the chamber 168 on the lower side thereof, and the stem 170 will be moved into engagement with contact 175, thereby establishing a circuit through the wire 177 which leads to the winding of the release magnet valve device 12.

Upon energization of the winding of the release magnet valve device 12, the double beat valve element 296 associated with the valve device is moved downwardly to cut off communication between the chamber 295 and the chamber 299, and to permit communication between the chamber 295 and chamber 303 which is connected to the atmosphere. This permits fluid to flow from the chamber 287 on the upper side of the valve 282 to the chamber 295 by way of the passage 298, and therefrom to the atmosphere.

On the consequent reduction in the pressure of the fluid in the chamber 287 the pressure of the fluid in the chamber 289 acting on the portion of the valve 282 outwardly of the seat rib 284 forces the valve 282 upwardly against the spring 285, and away from the seat rib 284, to permit fluid to flow from the chamber 289 to the chamber 299, and therefrom to the atmosphere by way of the passage 292 having the choke 293 interposed therein.

The chamber 289 is connected to the control pipe 17 by way of the passage 281 so that on the release of fluid from the chamber 289 fluid will be released from the control pipe 17.

On the release of fluid under pressure from the passage 95 of the relay valve device 5, fluid will also be vented from the chamber 93 and the piston 92 will be moved to the left so that the stem 106 moves the slide valve 100 to the position in which it is shown in Fig. 1 of the drawings, in which position communication is established by way of the port 107 through the slide valve 100 with the port 102 in the slide valve seat and between the valve chamber 98 and the port 103, so that fluid is released from the slide valve chamber to the atmosphere, while the valve element 111 and the pilot valve 120 are permitted to move to their seats, if they are not already in engagement therewith.

Upon the release of fluid under pressure from the valve chamber 98 fluid is released from the passage 132 and from the control pipe 17.

In addition, on the reduction in the pressure of the fluid in the passage 95 to a predetermined amount below the pressure of the fluid in the passage 132, which communicates with the control pipe 17, the fluid in the passage 153 will move the check valve 151 against the spring 155 away from the seat rib 152 so that fluid may flow from the passage 132 to the chamber 150 and therefrom by way of the passage 156 to the passage 95, from which it is released to the atmosphere.

If the handle of the engineer's brake valve 1 is left in the release position all of the fluid in the pipe 36, and in the passage 95, will be vented to the atmosphere so that substantially no fluid under pressure will be present in the chamber 165 of the switch device 7, or in the chamber 93 of the relay valve device 5.

The pressure of the fluid in the control pipe 17 will continue to reduce until it is reduced to a value substantially equal to that in the chamber 93 of the relay valve device 5 and the chamber 165 of the switch device 7. When the pressure of the fluid in the chamber 168 is reduced to a value substantially equal to that in the chamber 165 on the opposite side of the diaphragm 163, the diaphragm is held in the position in which the stem 170 is out of engagement with the contact 178, and is in engagement with the contact 175, thereby continuing to interrupt the circuit to the winding of the application magnet valve device 11 and maintaining the circuit through the winding of the release magnet valve device 12. The control pipe, therefore, will be connected to the atmosphere by way of the valve chamber 98 and the ports 102 and 103, and by way of the release magnet valve device 12.

On the release of fluid under pressure from the control pipe 17 fluid will be released from the chamber 188 on the upper side of the piston 186 of the relay valve device 9, and this piston will thereupon be moved upwardly by the pressure of the fluid in the slide valve chamber 191 on the lower side of the piston 186, thus causing the slide valve 192 to be moved to a position to uncover the exhaust passage 195 to permit fluid to escape from the brake cylinder to the atmosphere by way of the passage 196, the slide valve chamber 191, and the pipe and passage 215. This effects a release of the brakes.

In the braking system provided by this invention means is provided which is responsive to the pressure of the fluid in the brake pipe 18 and which operates on a reduction in the pressure of the fluid in this pipe to cut off communication between the supply reservoir 15, from which fluid is supplied to the brake cylinders, and the application magnet valve devices by means of which fluid is supplied to the control pipe.

If, therefore, the pressure of the fluid in the brake pipe 18 is reduced by reason of a break in two of the train, which would be accompanied also by a rupture of the control pipe 17, the supply of fluid from the supply reservoirs 15, which is the source of fluid for applying the brakes, to the application magnet valves will be cut off, with the result that the application magnet valves 11 cannot continue to supply fluid to the control pipe and thereby deplete the supply of fluid in the supply reservoirs 15.

On a reduction in the pressure of the fluid in the brake pipe 18 the piston 322 of the fluid pressure operated valve device is shifted to the left as viewed in the drawings, so that the slide valve 330 cuts off communication through the passage 335. The application magnet valve 11 therefore, cannot supply fluid from the supply reservoir 15, but it may supply fluid to the control pipe from the control reservoir 19, which provides a supply of fluid sufficient to effect an application of the brakes if the control pipe 17 remains intact. Therefore, after an emergency application of the brakes, which is accompanied by a reduction in the pressure of the fluid in the brake pipe 18, the application magnet valve device will normally operate to supply fluid to the relay valve device and to the control pipe to effect an application of the brakes.

Figure 3:
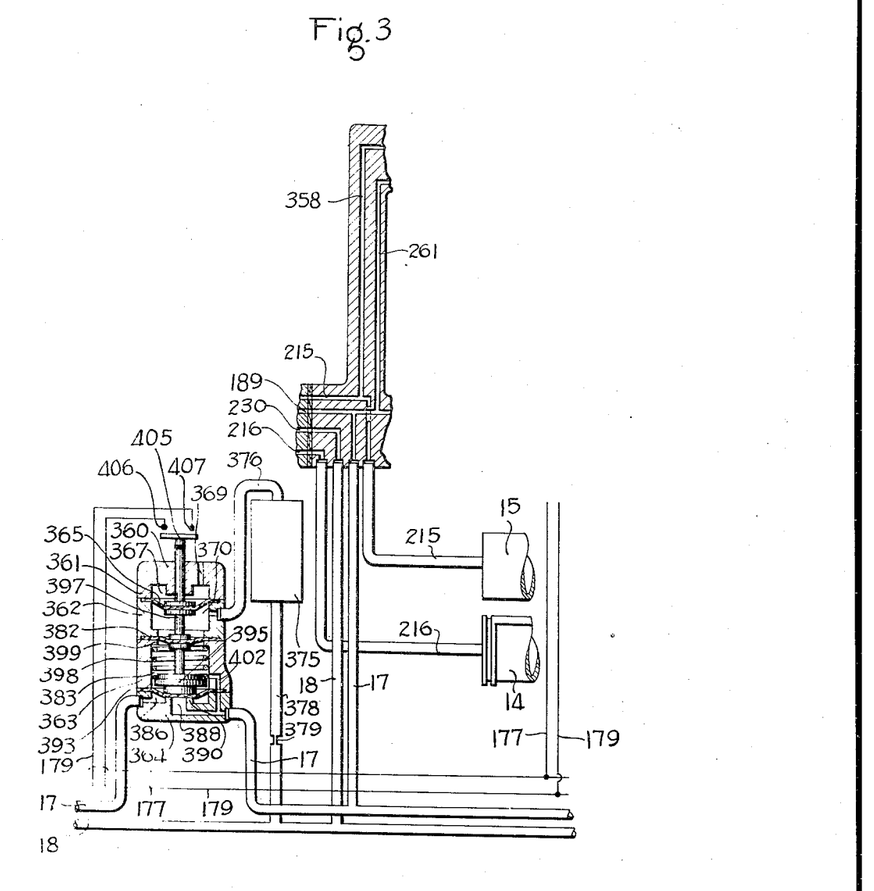
Fig. 3 is a fragmentary diagrammatic view of a modified form of braking system embodying my invention.

In Fig. 3 of the drawings I have illustrated a modified form of the braking system embodying my invention. The system illustrated in this figure of the drawings is generally similar to that shown in Fig. 1 of the drawings, and identical reference characters are employed for the elements of the system which are identical with the elements employed in the system shown in Fig. 1.

The system shown in this figure of the drawings differs from that shown in Fig. 1 of the drawings, however, in that the application magnet valve device 11 supplies fluid directly from the supply reservoir 15 rather than from a control reservoir, or indirectly from the supply reservoir 15 through a fluid pressure operated valve device such as is employed in the system shown in Fig. 1 of the drawings.

The connection between the application magnet valve device 11 and the supply reservoir 15 is effected by way of the passage 358 which joins the passage 215 leading to the supply reservoir 15.

In the system shown in this figure of the drawings a fluid pressure operated switch device, indicated generally by the reference numeral 360, is employed and is mounted on the engine of the train. The switch device 360 comprises a casing constructed of a plurality of sections, and including the sections 361, 362, 363 and 364.

A diaphragm 365 is clamped between the casing sections 361 and 362, and has on one side thereof a chamber 367, which is connected to the atmosphere by way of a passage 369, and has on the other side thereof a chamber 370 which is connected to a reservoir 375 by way of a pipe 376, while the reservoir 375 is connected to the brake pipe 18 by way of a pipe 378 having a choke or restricted portion 379 interposed therein. A diaphragm 382 is clamped between the casing sections 362 and 363, this diaphragm being of somewhat smaller diameter than the diaphragm 365. The diaphragm 382 is subject on one side to the pressure of the fluid in the chamber 370, and is subject on the other side to the pressure of the fluid in a chamber 383.

The casing section 364 has a chamber 386 formed therein and connected to the portion of the control pipe 17 which leads from the relay valve device 5, and in addition has a chamber 388 formed therein inwardly of a seat rib 390, and which is connected to the portion of the control pipe 17 which leads to the relay valve device 9.

A diaphragm 393 is clamped between the casing sections 363 and 364, and is adapted to be urged into engagement with the seat rib 390 by means of a plunger 395, which is actuated by a stem 397, which is operatively secured to the diaphragms 365 and 382, and by means of a spring 398 which extends between a shoulder 399 on the casing section 363, and the plunger 395 and normally urges the plunger downwardly so as to press the diaphragm 393 against the seat rib 390.

The chamber 383 is connected by way of a passage 402 with the portion of the control pipe 17 which is connected to the chamber 388.

The stem 397 has secured thereto, but insulated therefrom, a contact 405 which is adapted to establish a circuit between stationary contacts 406 and 407 to which the portions of the wire 179 which lead from the fluid pressure operated switch device 7, and to the application magnet valve devices 11 are connected.

In the operation of this system, when the brake pipe 18 is at atmospheric pressure the chamber 370 will also be at atmospheric pressure, and the plunger 395 will be urged downwardly by the spring 398 so as to cause the diaphragm 393 to engage the seat rib 390 and thereby cut off communication through the control pipe 17. In this position of the device the stem 397 will maintain the contact 405 out of engagement with the contacts 406 and 407, thus interrupting the circuit to the windings of the application magnet valve devices and maintaining these devices de-energized so that no fluid under pressure will be supplied thereby to the control pipe 17.

On an increase in the pressure of the fluid in the brake pipe 18 fluid will flow therefrom by way of the pipe 378 and a restricted portion 379 to the reservoir 375 and to the chamber 370 intermediate the diaphragms 365 and 382, and because of the differential areas of these diaphragms, the pressure of the fluid in the chamber 370 will force the stem 397 upwardly so that the contact 405 is in engagement with the contacts 406 and 407 and a circuit will be completed from the fluid pressure operated switch device 7 to the application magnet valve devices 11.

In addition, the plunger 395 will be lifted away from the diaphragm 393 so that fluid under pressure in the control pipe 17 acting on the lower face of this diaphragm will lift the diaphragm away from the seat rib 390 and permit communication between the different portions of the control pipe 17.

If, during the operation of the system the pressure of the fluid in the brake pipe 18 is reduced, either intentionally as a result of an emergency application of the brakes, or unintentionally as the result of a breakage of the brake pipe 18 caused by a breaking in two of the train or by any other reason, fluid will flow from the reservoir 375 to the brake pipe 18 through the restricted portion 379, and after a time interval, the pressure of the fluid in the reservoir 375 and in the chamber 370, which is connected thereto, will be reduced, and the force exerted by the fluid under pressure in the chamber 370 will be insufficient to maintain the stem 397 in its upper position and it will be moved to its lower position by the spring 398. This will cause the contact 405 to be moved away from the contacts 406 and 407 to interrupt the circuit to the application magnet valve devices 11, and will cause the diaphragm 393 to be moved against the seat rib 390 to cut off communication through the control pipe 17.

Fluid will flow from the reservoir 375 to the brake pipe at a relatively slow rate because of the restricted capacity of the choke 379 so that the pressure of the fluid in the reservoir 375, and in the chamber 370, will be maintained for a period so as to maintain the contact 405 in engagement with the contacts 406 and 407 for a time interval after the reduction in the pressure of the fluid in the brake pipe 18 occurs. This time interval is long enough to permit the application magnet valve devices 11 to supply sufficient fluid under pressure to the control pipe 17 to effect an application of the brakes, providing the control pipe 17 has not been broken.

After the lapse of this time interval, the pressure of the fluid in the reservoir 375 and in the chamber 370 will be reduced so that the plunger 397 will be moved downwardly and the circuit through the winding of the application magnet valve devices will be interrupted, thereby cutting off the further supply of fluid to the control pipe 17 by way of the application magnet valve devices. This prevents the further release of fluid under pressure from the supply reservoir 15, and prevents a continued supply of fluid under pressure to the control pipe 17, which would result in a complete release of the fluid in the supply reservoirs 15 in the event that the control pipe 17 were broken.

In the system shown in Fig. 3 of the drawings, therefore, it will be seen that the fluid pressure operated switch 369 operates on a reduction in the pressure of the fluid in the brake pipe 18 to interrupt the circuit to the windings of the application magnet valve devices so that the supply of fluid from the supply reservoirs 15 to the control pipe will be cut off, thereby preventing the complete loss of fluid from the supply reservoirs 15.

It will be seen also that in each of the systems shown in this application means is provided which is responsive to the pressure of the fluid in the brake pipe, and which operates on a reduction in this pressure to control the electrically operated means for supplying fluid to the control pipe so as to cut off the supply of fluid thereto from the supply reservoirs, that is, from the reservoirs from which fluid is supplied to the brake cylinders in effecting an application of the brakes.

While a preferred form, and a modified form of the braking system embodying my invention have been illustrated and described in detail, it should be understood that the invention is not limited to these details of construction and that numerous changes and modifications may be made without departing from the scope of the following claims.

Having now described my invention, what I claim as new and desire to secure by Letters Patent, is:

1. In a fluid pressure brake, in combination, a brake cylinder, a supply reservoir, a control reservoir, a relay valve device operated by an increase in fluid pressure for supplying fluid under pressure from the supply reservoir to the brake cylinder, means for supplying fluid under pressure to the control reservoir from the supply reservoir, a brake pipe, means subject to and operated upon a reduction in the brake pipe pressure for cutting off the supply of fluid to the control reservoir from the supply reservoir, and means for supplying fluid under pressure to the relay valve device from the control reservoir.

2. In a fluid pressure brake, in combination, a control pipe, a supply reservoir, a brake cylinder, a relay valve device operated by an increase in the pressure of the fluid in the control pipe for supplying fluid under pressure to the brake cylinder from the supply reservoir, manually controlled valve means for supplying fluid under pressure to the control pipe at one point, electrically controlled means for supplying fluid under pressure to the control pipe from the supply reservoir at another point, a brake pipe, and valve means subject to and operated upon a reduction in the pressure of the fluid in the brake pipe for cutting off communication between the supply reservoir and the point on the control pipe at which fluid is supplied thereto by the manually controlled valve means.

3. In a fluid pressure brake, in combination, a brake cylinder, a supply reservoir, a control reservoir, means for supplying fluid to the control reservoir from the supply reservoir, a brake pipe, a control pipe, a relay valve device operated by an increase in fluid pressure in the control pipe for supplying fluid under pressure to the brake cylinder from the supply reservoir, manually controlled valve means for supplying fluid under pressure to the control pipe, electrically operated means for supplying fluid under pressure to the control pipe from the control reservoir, and means subject to and operated upon a reduction in the pressure of the fluid in the brake pipe for cutting off the supply of fluid from the supply reservoir to the control reservoir.

4. In a fluid pressure brake, in combination, a brake pipe, a brake cylinder, a relay valve device operated on an increase in fluid pressure for supplying fluid under pressure to the brake cylinder, electrically operated means for supplying fluid under pressure to the relay valve device, and means for controlling the supply of current to the electrically operated means, said means comprising an abutment subject to the pressure of fluid in a chamber connected to the brake pipe, means controlled by said abutment and operated on a reduction in the pressure in said chamber for cutting off the supply of current to the electrically operated means, and means to restrict the rate of flow or fluid from the chamber to the brake pipe, whereby the pressure of the fluid in said chamber is maintained for a time interval subsequent to a reduction in the pressure of the fluid in the brake pipe.

5. In a fluid pressure brake, in combination, a brake cylinder, a supply reservoir, a control reservoir, a relay valve device operated by an increase in fluid pressure for supplying fluid under pressure to the brake cylinder, means operative to supply fluid under pressure from the control reservoir to operate said relay valve device, means subject to brake pipe pressure for controlling the supply of fluid under pressure from the supply reservoir to the control reservoir and operated upon a reduction in brake pipe pressure to cut off the supply of fluid from the supply reservoir to the control reservoir.

ELLIS E. HEWITT.